L. FORSE.
WHEEL FOR VEHICLES.
APPLICATION FILED JUNE 2, 1911.

1,002,254.

Patented Sept. 5, 1911.
2 SHEETS—SHEET 1.

WITNESSES:
Fred White
J. F. Wallace

INVENTOR:
Lyndall Forse,
By his Attorneys

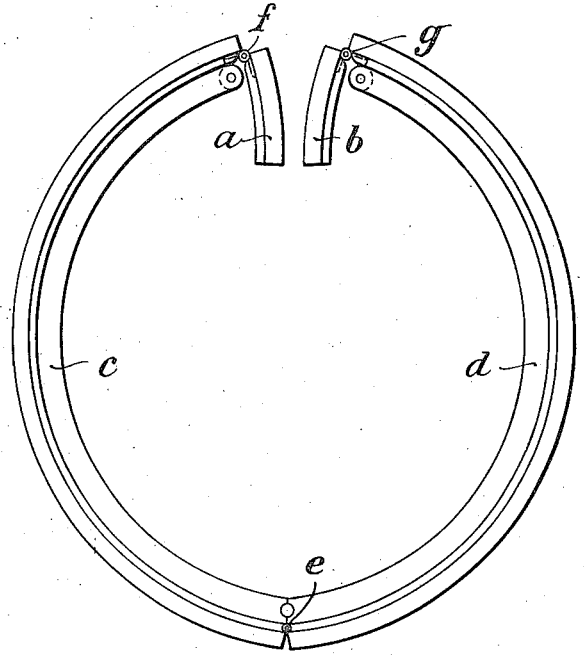
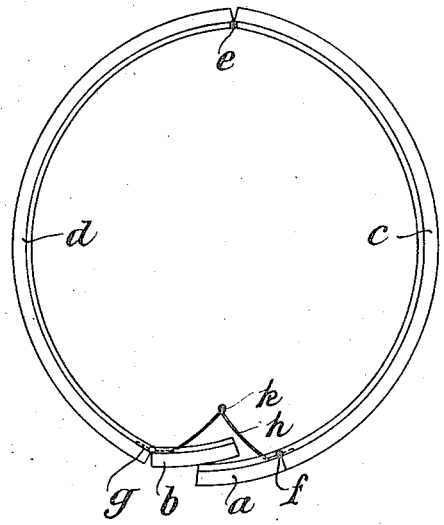
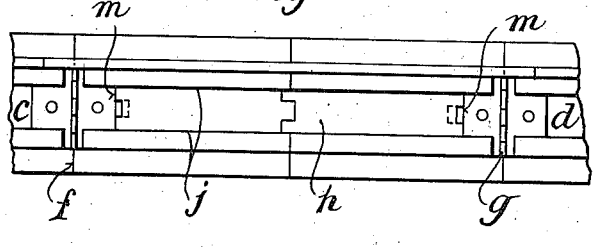
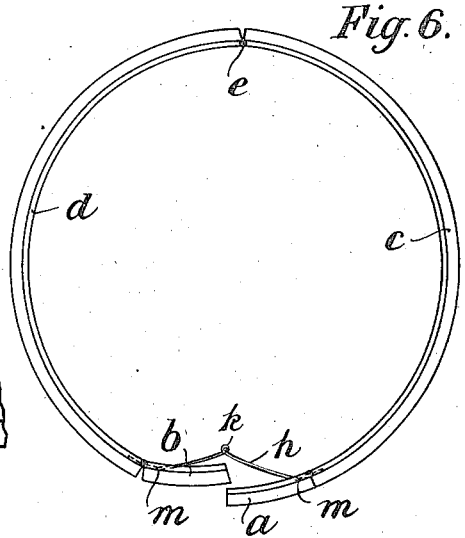

UNITED STATES PATENT OFFICE.

LYNDALL FORSE, OF YEOVIL, ENGLAND.

WHEEL FOR VEHICLES.

1,002,254.

Specification of Letters Patent. Patented Sept. 5, 1911.

Application filed June 2, 1911. Serial No. 630,785.

*To all whom it may concern:*

Be it known that I, LYNDALL FORSE, of "Westella," Grove avenue, Yeovil, in the county of Somerset, England, dispenser, have invented certain new and useful Improvements in and Relating to Wheels for Vehicles, of which the following is a specification.

This invention relates to wheels of vehicles of the type wherein the tire is carried upon a rim adapted to be detached from the wheel and collapsed to facilitate the removal of the tire. In tires of this construction it has been proposed to form the rim of hinged members with free or unattached ends adapted to be collapsed by folding the hinged portions inwardly one over the other.

This invention has for its object to provide an improved construction of wheel of this type, whereby the parts may be more readily taken apart and assembled and firmly held together in use.

In a wheel made in accordance with this invention the detachable and collapsible rim is adapted to be forced out into its expanded position by a toggle lever.

The accompanying drawings show one method of carrying out this invention.

Figure 1:
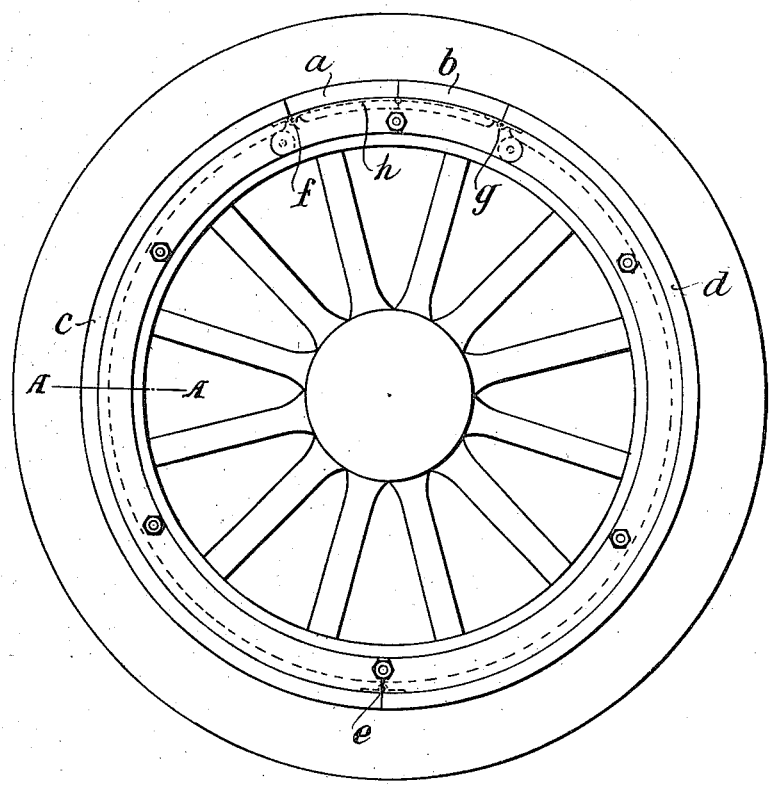
Figure 2:

Figure 1 is an elevation of the wheel provided with a collapsible rim made in accordance with this invention. Fig. 2 is a part sectional elevation on line A—A Fig. 1. Fig. 3 is an elevation of the rim in its collapsed position. Fig. 4 is an enlarged plan of part of the rim and toggle lever. Figs. 5 and 6 are diagrammatic views showing the means of expanding and locking the rim.

The rim is composed of members $a$ $b$ $c$ and $d$ hinged together at $e$ $f$ and $g$ leaving the members $a$ and $b$ free at one end; $h$ is a pair of hinged bars adapted to lie in a groove $j$ formed in the rim when the rim is in its expanded position.

When it is desired to expand the rim within the tire the rim is placed centrally of the tire and forced open as much as can be conveniently done by the hand. The hinged bar $h$ is then applied as shown in Fig. 5 in such a manner that the ends of the hinged bar bear against the hinges $f$ and $g$ of the rim; pressure is then applied at the point $k$ which expands the rim somewhat, the hinged bar is then placed so that its ends bear against the ends $m$ of the groove $j$ (Fig. 4), pressure is again applied at the point $k$ and the hinged bar $h$ acting as a toggle lever expands the rim and forces it outward into its fully expanded position. The hinged bar $h$ then lies flat in the groove $j$ and securely locks the parts. To collapse the rim, a pointed tool is used to lift the toggle $h$ out of its groove.

What I claim and desire to secure by Letters Patent is:—

1. The combination of a hinged rim, free ends to said rim, stops on the rim, a hinged bar adapted to butt against the stops, said hinged bar being adapted to be forced into a circumferential position to hold the hinged rim in its circular form.

2. The combination of a hinged rim, free ends to said rim, a groove in said free ends, stop ends to the groove, a hinged bar adapted to bear against the stop ends and to lie in the groove when the rim is expanded to its circular form.

3. The combination of a rim comprising a plurality of sections, two of which are adapted to turn inwardly to collapse the rim, and a hinged bar adapted to press said sections into their normal expanded position, so that said inturned sections may be brought to a circumferential position.

In witness whereof, I have hereunto signed my name in the presence of two subscribing witnesses.

LYNDALL FORSE.

Witnesses:
REGINALD EATON ELLIS,
ROBERT MILTON SPEARPOINT.